No. 810,537. PATENTED JAN. 23, 1906.
H. A. HOPKINS.
GARMENT FASTENER.
APPLICATION FILED MAY 8, 1905.

WITNESSES:

INVENTOR
Heber A. Hopkins

UNITED STATES PATENT OFFICE.

HEBER A. HOPKINS, OF WEST ROXBURY, MASSACHUSETTS.

GARMENT-FASTENER.

No. 810,537.

Specification of Letters Patent.

Patented Jan. 23, 1906.

Application filed May 8, 1905. Serial No. 259,440.

*To all whom it may concern:*

Be it known that I, HEBER A. HOPKINS, a citizen of the United States, residing at West Roxbury, in the county of Suffolk and State of Massachusetts, have invented certain new and useful Improvements in Garment-Fasteners, of which the following is a specification.

My invention relates to that class of two-part garment-fasteners in which an elongated head provided with a fastening-plate is adapted to engage a socket member consisting of a plate having struck up thereupon a raised portion provided with an elongated slot or opening for the passage of said head which when turned a quarter-revolution will be locked within said socket member.

To improve the construction of garment-fasteners of this description is the object of my invention, which consists in certain novel features and details of construction, as hereinafter described, and pointed out in the claim, whereby additional security is afforded and the liability of the two members becoming unfastened from each other is reduced to a minimum.

Figure 1:
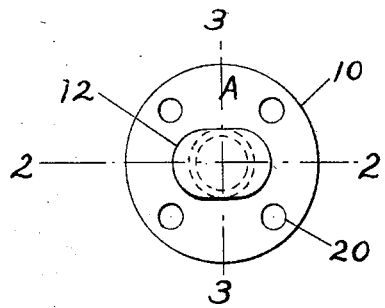
Figure 2:
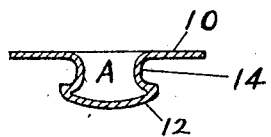
Figure 3:
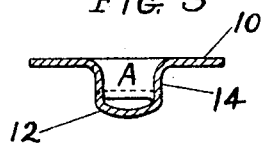
Figure 4:
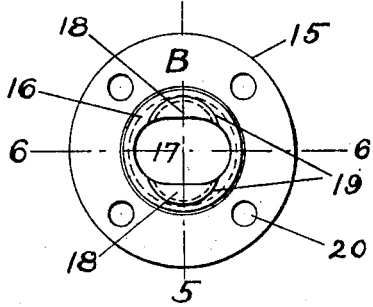
Figure 5:
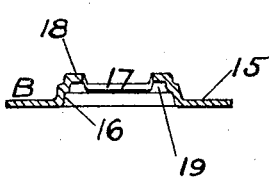
Figure 6:
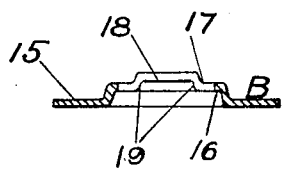
Figure 8:
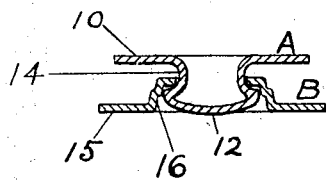
Figure 7:
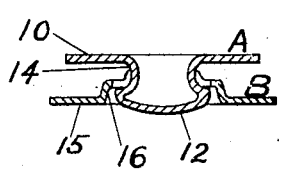

In the accompanying drawings, Figure 1 is a plan view of the member of the fastener which carries the elongated head or button. Fig. 2 is a vertical section of the same on the line 2 2 of Fig. 1. Fig. 3 is a vertical section of the same on the line 3 3 of Fig. 1. Fig. 4 is a plan view of the socket member of the fastener. Fig. 5 is a section of the same on the line 5 5 of Fig. 4. Fig. 6 is a section of the same on the line 6 6 of Fig. 4. Fig. 7 is a section of the entire fastener, showing the head member in the position which it occupies after entering or before leaving the slot of the socket member. Fig. 8 is a similar section, showing the position of the parts when the two members are securely locked together.

In the said drawings, A denotes one of the members of the fastener comprising a plate 10, preferably of circular form and provided with an oval or elongated head 12, which is connected with said plate 10 by a round shank 14, the diameter of which may be the same as or less than the shortest diameter of the head, the plate, shank, and head being preferably formed of a single piece of metal struck up in a suitable die.

B represents the other or socket member of the fastener, consisting of a plate 15, having struck up on the side which lies next to the member A a raised circular concavo-convex portion 16, provided at its top with an elongated slot or opening 17 for the passage of the head 12 of the member A, which is adapted to be contained within said raised portion 16, within the top of which is formed an elongated chamber 18, disposed with its longer axis at right angles to that of the slot or opening 17, as shown particularly in Figs. 4, 5, and 6, said chamber being adapted to receive the head 12 of the member A when turned a quarter-revolution after being passed through said opening 17, the outward strain or pull on the member A causing the head to be drawn up into said chamber with a snap as it passes the shoulders 19, formed by the difference in height between the chamber 18 and the surrounding interior surface of the raised portion 16. The normal position of the head 12 when attached to the garment is with its longer diameter at right angles to that of the opening 17 of the socket member, so that it requires to be turned by the hand a quarter-revolution to enable it to enter the slot, after which it is turned back to its normal position to cause it to enter the upper chamber 18, which can be easily felt as it passes the shoulders 19, in which position it will be securely locked and the two parts of the fastener thus prevented from becoming separated until the operation is reversed.

It will be noticed that when the head 12 is within the chamber 18 it will be immovably held in place against lateral strain not only by the form of the chamber itself, but also by reason of the diameter of the shank of the head being equal to the width of the slot at the center, and consequently loose motion of one member within the other is avoided when in use. Another advantage due to my improved construction is that the parts are not liable to become bent out of shape and rendered inoperative in passing through wringer-rolls when the garment to which they are attached is being laundered, thus making them more durable and serviceable.

The plates 10 15 are each provided with holes 20 to enable them to be sewed to the garments or parts to be secured together; but other suitable means for securing them to the garments may be provided, if preferred.

What I claim as my invention, and desire to secure by Letters Patent, is—

A two-part garment-fastener comprising a plate adapted to be attached to a garment, said plate having a shank and an elongated head both integral therewith; and a socket member adapted to be fastened to a garment, said socket member having a raised concavo-convex portion adapted to contain said head and provided with an elongated slot for the passage therethrough of said head, said raised portion having an elongated chamber 18 arranged with its longer diameter at right angles to that of said slot, and extending outwardly from the interior of said concavo-convex portion, said chamber adapted to receive said elongated head after said head has been passed through said slot and into the interior of said concavo-convex portion, whereby said parts are securely locked together.

Witness my hand this 2d day of May, A. D. 1905.

HEBER A. HOPKINS.

In presence of—
    P. E. TESCHEMACHER,
    A. S. WALL.